United States Patent [19]

Margolin

[11] 4,455,450

[45] Jun. 19, 1984

[54] DIGITIZING TABLET

[76] Inventor: George D. Margolin, 1815 Sherington Pl., Newport Beach, Calif. 92663

[21] Appl. No.: 305,739

[22] Filed: Sep. 25, 1981

[51] Int. Cl.³ ............................................ G08C 21/00
[52] U.S. Cl. ..................................................... 178/18
[58] Field of Search .......................... 178/18, 19, 20; 434/339, 410; 160/378; 340/146.3 SY; 200/83 R, 5 A; 338/71, 99, 87, 92, 114, 333, 334; 307/116

[56] References Cited

U.S. PATENT DOCUMENTS 4,046,975  9/1977  Seeger .................................. 200/5 A
4,289,925  9/1981  Lambden .............................. 178/18

Primary Examiner—Stafford D. Schreyer
Attorney, Agent, or Firm—Bromberg, Sunstein & McGregor

[57] ABSTRACT

A digitizing tablet is realized by maintaining first and second sheets of insulating material in a spaced apart position by sealing them together and filling the resulting pocket with air or fluid under pressure. Coordinates for the position of a stylus on the face of one of the sheets are obtained with electrical conductors defined on the inner faces of the two sheets. Access for energization and output is obtained at the edges.

7 Claims, 5 Drawing Figures

DIGITIZING TABLET

DESCRIPTION

1. Field of the Invention

This invention relates to an input device such as electronic digitizer useful in graphic display systems and, more particularly, to such devices which provide an electrical indication of the position of a writing implement in the field of the writing surface.

2. Background of the Invention

Digitizers are well known in the art. U.S. Pat. No. 3,706,850 issued to G.M.C. Jishe et al. Dec. 19, 1972, for example, shows one such arrangement. In the arrangement shown in that patent, a resistive layer and an electrically conducting layer are disposed in juxtaposition with a small air gap between them. X and Y oriented electrical conductors are defined in the resistive layer and means are arranged to apply energizing potential at discrete electrode points along each of the X and Y axes via diodes or similar devices that permit conduction in one direction only. The diodes permit electrical isolation between the nonconducting electrodes and the conducting electrodes. U.S. Pat. No. 3,440,522 issued Apr. 22, 1969 to J. A. Kruse is also of interest in this connection.

Another digitizer arrangement is shown in U.S. Pat. No. 3,959,585 issued May 25, 1976 to H. G. Mattes et al. That arrangement shows first and second resistive sheets on first and second layers spaced apart by an air gap or, alternatively, by a normally nonconducting material. The sheets overlap in an area denominated the "active writing surface", every point in which it is uniquely defined by a pair of coordinates along two nonparallel axes taken to be orthogonal and again defining X and Y axes.

A source of energizing potential is provided in the Mattes et al. arrangement to generate a uniform voltage gradient across the X dimension of the first resistive sheet and the Y dimension of the second resistive sheet alternately. An output circuit is arranged for alternate connection to the non-energized sheet. In operation, a writing implement or stylus applied to a selected point in the XY field results in a localized contact between the two resistive sheets. When the first resistive sheet is energized, a voltage indicative of the position of the stylus along one dimension (say the X dimension) is applied to the output circuit via the second (non energized) resistive sheet. Similarly, when the second resistive sheet is energized, a voltage indicative of the Y dimension of the position is applied to the output circuit via the first resistive sheet.

The latter arrangement employs only two layers and accordingly is relatively inexpensive. Moreover, because each resistive sheet is energized along a single axis, the energizing potential may be applied by means of a strip electrodes. The necessity for a large number of isolating diodes is eliminated.

In each of the foregoing arrangements, it is necessary to maintain a small air gap between two layers or sheets. The positioning of a stylus closes this gap at a selected point thus permitting the energizing voltage to be applied to the output circuit in a manner indicative of the position of the stylus.

One problem, with digitizers of this type, is that the air gap is difficult to maintain. In the last-mentioned patent, for example, a plastic frame is employed as a spacer. One resistive layer is pulled over the frame under tension in a manner to maintain a 1.5 mm spacing with the second resistive layer positioned beneath the first. Changes in humidity or temperature, for example, are quick to create havoc in such an arrangement. Although relatively simple, the arrangement has not been accepted commercially. A variety of alternative separating means have also been suggested. For example, insulating islands, liquid, liquid gel and insulating beads are described for this purpose in U.S. Pat. No. 3,885,097. None of these arrangements has been accepted commercially.

Brief Description of the Illustrative Embodiments of the Invention

The foregoing problem is resolved herein by employing, preferably, a gaseous medium under pressure between two layers which are spaced apart and contain electrical means for obtaining the X and Y dimension of the position of contact of a stylus. In its simplest form, a digitizer is provided herein by forming X and Y conductors on first and second layers of plastic such as Mylar. The conductor patterns are positioned facing one another and the two plastic layers are sealed at the edges in a manner to insulate the two patterns from one another. Two edges of each of the layers are conveniently doubled over to expose the underside of the layer and the electrical terminations are defined on the exposed edges for ease of interconnection to each of the layers. The pocket defined between the two layers is then filled with a gas, such as air, under pressure to maintain a fixed separation between the layers.

The resulting "pillow" digitizer is conveniently secured in a frame to provide further dimensional stability in a plane. But a frame is not necessary. Alternatively, one of the plastic layers may be made sufficiently thick to provide overall dimensional stability. In still another arrangement, the two plastic layers may be secured to a dimensionally stable surface as an overlay. Particularly if the plastic layers are transparent, this last arrangement is attractive for use with a television set where it may be secured to the face of the tube for implementing interactive TV games and the like. Alternatively, an insulating fluid under pressure can be used instead of air.

DETAILED DESCRIPTION

Figure 1:
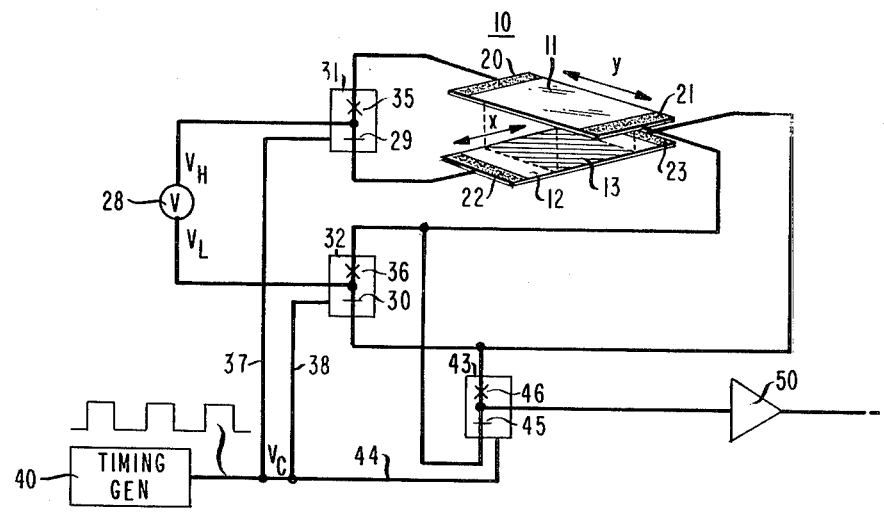
FIG. 1 is a block diagram of an input terminal arrangement constructed in accordance with the principle of this invention.

FIG. 1 shows an illustrative digitizing tablet arrangement 10 in accordance with one embodiment of this invention. The arrangement includes first and second generally rectangular layers or sheets 11 and 12. The sheets are aligned so as to overlap in a central area 13 shown shaded in the FIG. The area of overlap defines the active writing field. The resistive sheets may be fabricated from a conductive ink, such as carbon loaded Viton, or other suitable material having a resistance of about 10–1000 ohms/square, screened onto a Mylar sheet.

Continuous electrodes 20 and 21, and 22 and 23 are formed on opposite edges of sheets 11 and 12 respectively. The electrodes may be fabricated from a conductive material such as silver or copper. When an energizing potential is applied to electrodes 20 and 21, a voltage gradient is established across sheet 11 in a direction perpendicular to the electrodes. Similarly, a voltage gradient is established in sheet 12. We will adopt the convention that the voltage gradients in sheets 11 and 12 align with orthogonal X and Y axes with respect to which the position of a stylus on the upper surface of layer 11, as viewed in the figure, can be determined.

The circuitry for energizing sheets 11 and 12 is as described in the above-mentioned Mattes et al. patent in the illustrative embodiment. Specifically, a source 28 of energizing potential in connected across electrodes 22 and 23 of sheet 12 by means of normally closed contact 29 and 30 of switches 31 and 32 respectively. When switches 31 and 32 are actuated, contacts 29 and 30 are opened and normally open contacts 35 and 36 are closed, thereby transferring source 28 to a connection across electrodes 20 and 21 of sheet 11. Switches 31 and 32 are controlled via leads 37 and 38, respectively, by a timing generator 40 which produces a square wave or alternately high-low output. Generator 40 also controls an additional switch 43 via lead 44. Switch 43 includes normally closed contact 45 and normally open contact 46. The former connects electrode 21 of sheet 11 to the input of high input impedance amplifier 50, while the latter, when closed by a high output on lead 44, transfers the connection to amplifier 50 to electrode 23 of sheet 12.

Sheets 11 and 12 are energized alternately by source 28 under the control of switches 31 and 32. Whenever one sheet is energized, it acts as a transmitter. The non-energized sheet, which is electrically floating, is connected to amplifier 50 via switch 43 and acts as a sensor. When the sheets are brought into contact with each other by depression of sheet 11 by a stylus, the voltage on the energized sheet at the position of the stylus is transmitted, by the non-energized sheet, to amplifier 50. Specifically, when the output of timing generator 40 is low, sheet 12 is energized and the voltage on sheet 12 (applied to amplifier 50) represents the X coordinate of the stylus position. When the output of generator 50 is high, sheet 11 is energized and the voltage on sheet 12 represents the Y coordinate of the stylus similarly. The output of amplifier 50 may be applied to a display such as a TV screen or transmitted to a remote location in a manner to display the position of the stylus in a well known manner.

The Mattes et al. patent also shows a stylus upstylus down circuit for avoiding errors in such digitizers.

Figure 2:
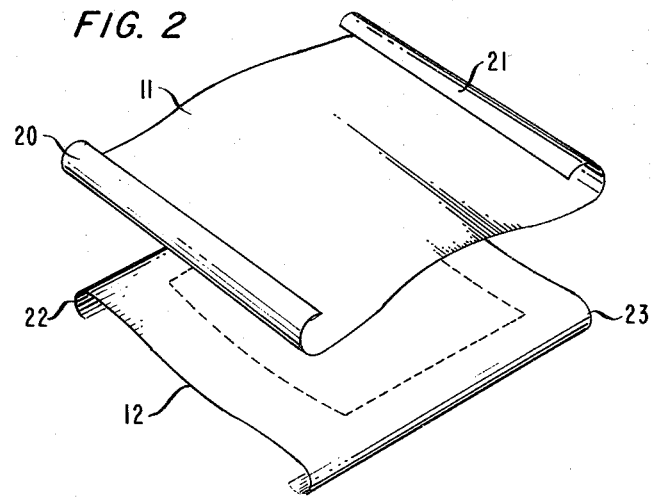
FIGS. 2 and 5 are schematic diagrams of alternative embodiments of a portion of the arrangement of FIG. 1.
Figure 3:
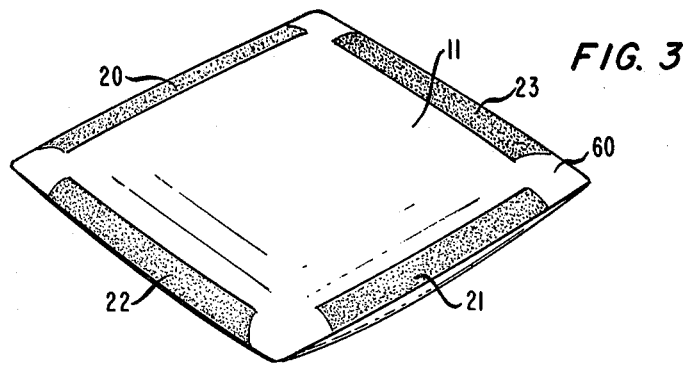
FIGS. 3 and 4 are schematic views of the embodiments shown either in FIGS. 2 or 5 in sealed configuration and with a securing frame respectively.

FIG. 2 shows a schematic diagram of a portion of the digitizing arrangement of FIG. 1. FIG. 2, specifically, shows sheets 11 and 12 separated and contoured in a manner to permit sealing to one another. FIG. 3 shows the sheets sealed into a pillow form 60 with electrodes 20, 21, 22, and 23 exposed for contact. The pillow is filled with air under pressure to provide dimensional stability.

Figure 4:
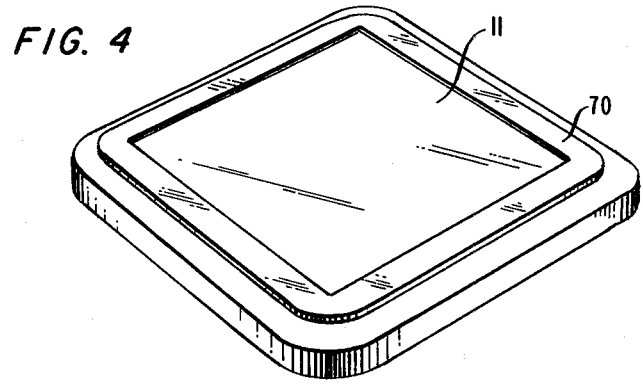

FIG. 4 shows a practical form for the digitizing tablet with surface 11 exposed. Bezel 70 is adapted as a frame to secure pillow 60 of FIG. 3 into a fixed position.

Figure 5:
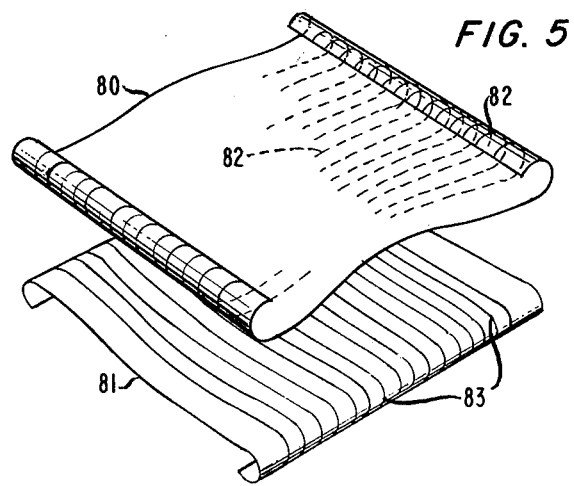

It is to be understood that the gas-pressurized pillow digitizing tablet can be used with any known electronic means for obtaining the coordinates of a stylus as described. Accordingly, resistive sheets as described above may be replaced by sheets 80 and 81 as shown in FIG. 5 where the sheets have discrete X and Y oriented conductor patterns 82 and 83 respectively. Arrangements of this type typically employ a diode arrangement as mentioned above.

The pillow of FIG. 3 may be filled with any convenient gas such as air or nitrogen conveniently at a pressure over ambient (14.7 lbs./sq. inch or 101 kPa). A pressure of about 15.5 lbs. per sq. inch (107 kPa) is adequate for a two mil Mylar sheet. For uses in high altitude applications, it is preferred to maintain the pressure at some high level such as two atmospheres and to use a more rigid material to minimize variations due to changes in altitude. It is also contemplated herein to employ alternatively an insulating liquid separator, again and importantly under pressure, to fill the pillow digitizer, although a pressurized gas separator is preferred in most uses. It is preferred, for example, to use a gas rather than a liquid in equipment where the digitizing tablet is to be disposed in a vertical position such as against the face of a TV tube or as a control panel for a high fidelity tuner or a radio dial. In this latter regard, particularly it is helpful to recognize that a variety of overlay patterns can be applied to surface 11 to define, for example, a key board or a control panel face. The arrangement even can be adapted for sensing the direction of motion of a human finger (or other stylus) on the active area. Thus, the sliding of the stylus on the surface can be made to cause digital changes in state for controlling electronic devices. Digital tuning, sound volume, brightness, speed, etc. all can be controlled in this manner. An expensive (but non-transparent) device for accomplishing these functions is available as the "FERENSTAT", model: FR-105 from Touch Activated Switch Arrays, Inc., Santa Clara, Calif.

What has been described is considered merely illustrative of the principles of this invention. Therefore, various modifications thereof can be devised by those skilled in art in accordance with those principles within the spirit and scope of the invention as encompassed by the following claims.

What is claimed is:

1. An arrangement for generating an electrical representation of the location of an implement on a writing area, said arrangement comprising first and second sheets of insulating material, at least one of said sheets being deformable, said first and second sheets including first and second electrical means respectively, for generating the X and Y coordinates of said location when said sheets are urged into contact with one another by said implement, said sheets being sealed to one another in a manner to insulate said first and second electrical means from one another and to form a sealed pocket therebetween, said pocket containing an insulating fluid or gaseous medium under pressure for maintaining said sheets in a spaced apart position.

2. An arrangement in accordance with claim 1 wherein at least one of said insulating sheets is transparent.

3. An arrangement in accordance with claim 1 wherein said first sheet is dimensionally stable.

4. An arrangement in accordance with claim 1 also including a frame for securing said first and second sheets in a dimensionally stable position.

5. An arrangement in accordance with claim 2 wherein said first sheet is dimensionally stable.

6. An arrangement in accordance with claim 1 wherein said gaseous medium is air under pressure.

7. An arrangement according to claim 1 wherein the first and second electrical means include first and second arrays of parallel conductors attached to said first and second sheets respectively, the first array being substantially orthogonal to the second array.

* * * * *